United States Patent [19]
Franceschini

[11] Patent Number: 5,832,650
[45] Date of Patent: Nov. 10, 1998

[54] SELF-RIGHTING STABILIZING ADAPTOR FOR FLOATING WATERFOWL DECOY

[75] Inventor: Augusto Franceschini, Rero, Italy

[73] Assignee: Carry-Lite, Inc., Milwaukee, Wis.

[21] Appl. No.: 764,760

[22] Filed: Dec. 12, 1996

[51] Int. Cl.[6] ............................................. A01M 31/06
[52] U.S. Cl. ............................................................. 43/3
[58] Field of Search ............................................. 43/2, 3

[56] References Cited

U.S. PATENT DOCUMENTS

| 1,392,065 | 9/1921 | Klock . | |
|---|---|---|---|
| 2,043,827 | 6/1936 | Breuer . | |
| 2,368,834 | 2/1945 | Higgins | 43/3 |
| 2,591,554 | 4/1952 | Klnney | 43/3 |
| 2,622,360 | 12/1952 | Bertram | 43/3 |
| 2,816,383 | 12/1957 | Locher | 43/3 |
| 2,817,918 | 12/1957 | Phillips . | |
| 3,704,538 | 12/1972 | Gagnon | 43/3 |
| 3,733,733 | 5/1973 | Ruter | 43/3 |
| 3,834,054 | 9/1974 | Gentry et al. | 43/3 |
| 4,422,257 | 12/1983 | McCrory | 43/3 |
| 4,757,630 | 7/1988 | Torberg | 43/3 |
| 5,172,507 | 12/1992 | Franceschini | 43/3 |
| 5,207,757 | 5/1993 | Franceschini | 43/3 |
| 5,377,437 | 1/1995 | Roos et al. | 43/3 |
| 5,461,816 | 10/1995 | Gazalski | 43/3 |

Primary Examiner—Kurt Rowan
Attorney, Agent, or Firm—Nilles & Nilles, S.C.

[57] ABSTRACT

A self-righting stabilizing adaptor for a floating waterfowl decoy comprises a relatively wide, flat hollow body, with a central slot extending through a substantial portion of the adaptor for slidingly attaching it to the keel of the decoy. The adaptor effectively lowers the center of gravity of the decoy so that, in the event the decoy is placed onto a body of water upside down, the decoy will tip upright. The adaptor is filled with ballast water flowing through water inlet and outlet orifices on the edges of the adaptor, which stabilize the manner in which the decoy floats on the surface of the water.

5 Claims, 3 Drawing Sheets

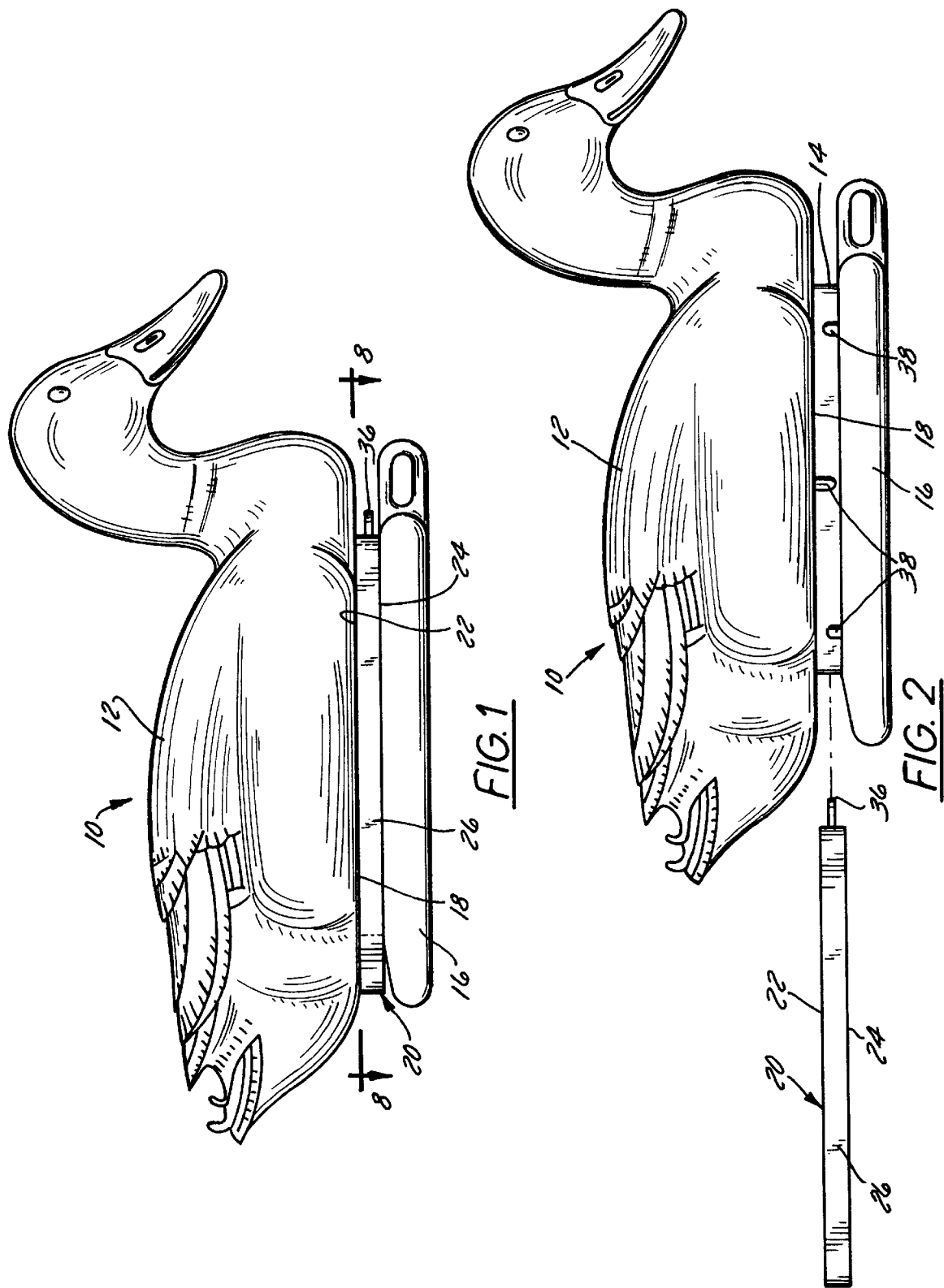

SELF-RIGHTING STABILIZING ADAPTOR FOR FLOATING WATERFOWL DECOY

BACKGROUND OF THE INVENTION

1. Field of the Invention

The present invention relates to an adaptor for attachment to a floating waterfowl decoy in order to provide the decoy with self-righting and ballast stabilizing characteristics.

2. Background of the Invention

Hunters of ducks and other waterfowl often hunt from a boat or a hunting blind located close to water, and, at such locations, it is common practice to disperse a number of decoys on the water in order to attract real waterfowl to the hunting spot. Decoys are dispersed by simply tossing them upon the water. Unfortunately, some decoys may land in the surface of the water upside down. Also, plastic decoys are usually quite light. Consequently, they tend to "bob" in the waves of the water.

Hunters naturally desire to have the decoys look as real and lifelike as possible. An upside down decoy clearly does not look real. A decoy which "bobs" in the water excessively also detracts from the lifelike appearance. Therefore, it is desirable to have a floating waterfowl decoy with self-righting and ballast stabilizing characteristics in order to enhance the lifelike appearance of the decoy. Moreover, since a large number of decoys are already "in the field," so to speak, it is desirable to provide an adaptor that is easily attachable to a decoy in order to provide it with the desired self-righting and stabilizing characteristics.

SUMMARY OF THE INVENTION

An adaptor for attachment to a floating waterfowl decoy which will provide it with self-righting and ballast stabilizing characteristics is presented.

The decoy is typically comprised of a main body in the form of a waterfowl, and a keel extending downwardly from the underside of the main body. Often the decoy includes a ballast tank attached at the lower end of the keel. (Although a particular decoy may have a ballast tank integrally incorporated into the decoy itself, it has been found that many such decoys still tip upside down or "bob" excessively in the water.)

The adaptor comprises a hollow plastic body slidably attachable over the keel directly beneath the underside of the decoy. More specifically, the adaptor is a relatively wide, flat and hollow attachment that has a slot extending partially down the center of the adaptor so that it may be slid over the keel. The body further includes water inlet and outlet openings so that, once the decoy has been placed in the water, the hollow body will fill with ballast water.

The additional weight of the adaptor is enough to change the center of gravity of the decoy so that, in the event the decoy lands in the water upside down, it will tip upright. Also, when the hollow adaptor becomes filled with ballast water, the decoy will stabilize and float more smoothly on the water and thus appear more lifelike.

The adaptor also slides easily onto and off of the keel of the decoy. Consequently, the adaptor may be sold either as an option in combination with the decoy, or it may be sold separately so that the hunter can retrofit previously purchased decoys with the adaptor.

Other objects and advantages of the invention will become apparent from the following description taken in connection with the accompanying drawings which set forth, by way of illustration and example, certain embodiments of the invention.

BRIEF DESCRIPTION OF THE DRAWINGS

The drawings, which constitute part of the specification and include exemplary embodiments of the present invention include the following.

FIG. 1 is a side view of the decoy with an adaptor of the present invention.

FIG. 2 is a side view showing the adaptor detached from the decoy.

DETAILED DESCRIPTION OF THE INVENTION

Figure 3:
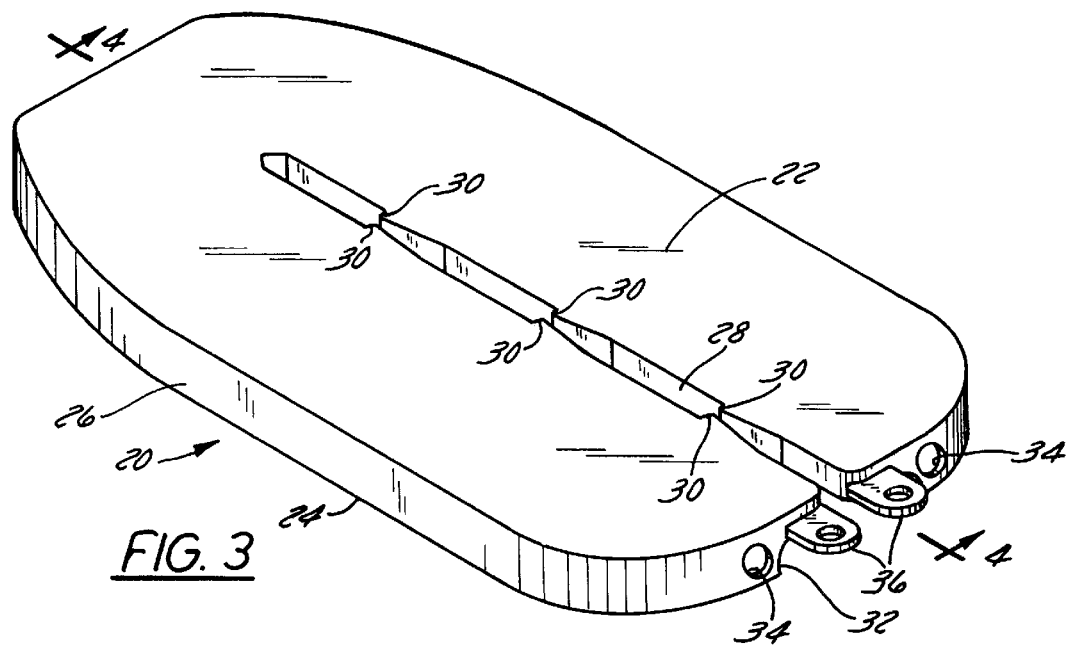
FIG. 3 is a perspective view of the adaptor predominantly showing the upper side of the adaptor.
Figure 4:
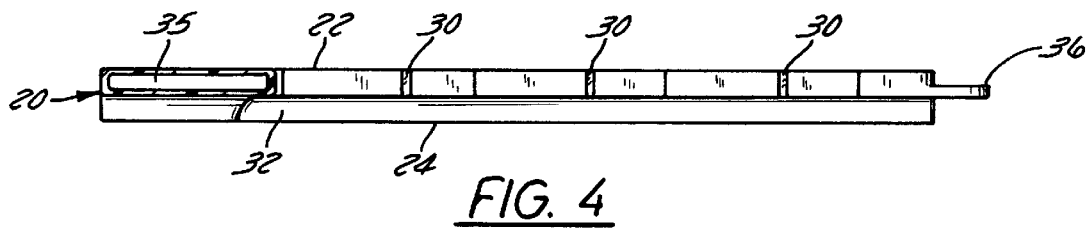
FIG. 4 is a cross-section view of the adaptor (along line 4—4 of FIG. 3).
Figure 5:
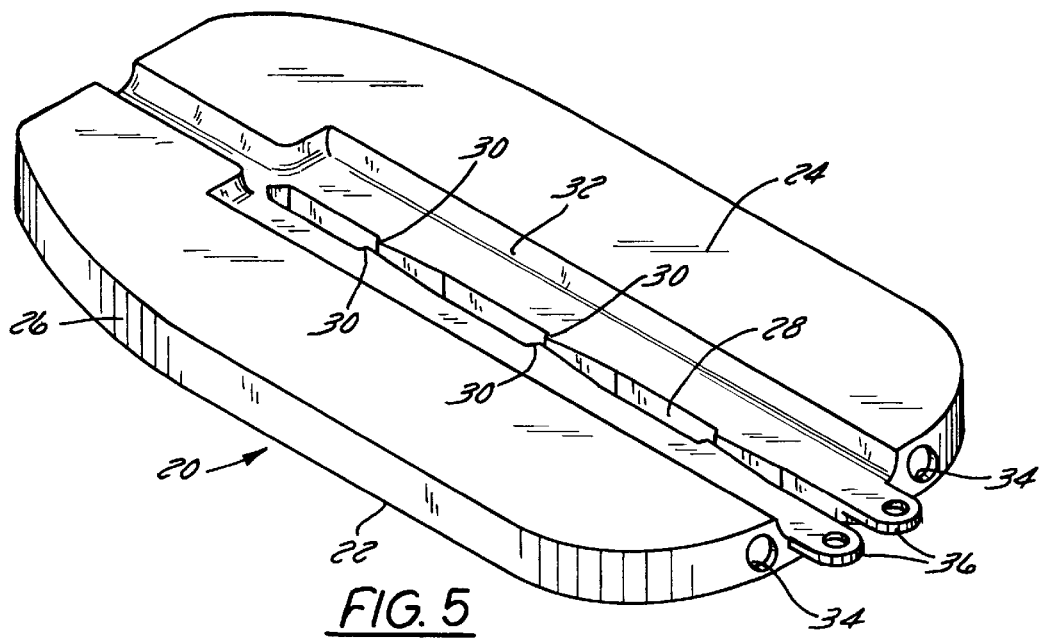
FIG. 5 is a perspective view of the adaptor predominantly showing the lower side of the adaptor.

The self-righting and ballast-stabilizing adaptor presented herein is intended for use in combination with a floating waterfowl decoy 10. The decoy 10 comprises at least a main body 12 and keel 14, and may also include a ballast tank 16. More specifically, the main body 12 is a large hollow, soft plastic shell in the shape of a waterfowl, including the body of the bird, head and neck. The main body 12 is provided with the shape, texture and colors necessary to accurately simulate a duck or other waterfowl as it would appear on the surface of a body of water. The keel 14 is a relatively thin longitudinal member extending along the center of the underside 18 of the decoy 10 and depending downwardly from the bottom thereof. The ballast tank 16 of the decoy 18 is ordinarily an elongated, tubular body section attached to the lower extremity of the keel 14. Other details of such decoys are described in my previously issued U.S. Pat. Nos. 5,172,507 and 5,207,757, which are fully incorporated herein by reference.

The self-righting, stabilizing adaptor 20 essentially comprises a hollow body attachable to the keel 14 of the decoy 10. More specifically, the adaptor 20 comprises a relatively wide and flat upper surface 22, a correspondingly wide and flat lower surface 24, and relatively narrow side edge 26. The narrow side edge 26 connects the perimeter of the upper surface 22 to the perimeter of the lower surface 24 so that the lower surface is spaced apart from the upper surface, thereby forming a relatively wide, flat yet hollow chamber. The adaptor 20 is preferably made of plastic.

The adaptor 20 is somewhat oblong, meaning that it somewhat longer than it is wide, and moreover, the overall shape of the adaptor 20 conforms generally to the underside 18 of the main body 12 of the decoy 10. In other words, the adaptor 20, and more specifically the upper surface 22 of the adaptor, extends under an area substantially corresponding to the underside 18 of the decoy 10 and, when viewed from above the decoy, is hidden from view by the decoy. Also, since the underside 18 of the decoy 10 is flat, the upper surface 22 of the adaptor 20 is also preferably flat so that it abuts against the underside of the decoy. However, since the ballast tank 16 on the decoy may be positioned quite closely to the underside of the decoy, the lower surface 24 of the adaptor is preferably provided with a central recessed area 32 for fitting the adaptor over the ballast tank of the decoy.

The adaptor 20 further includes a slot 28 extending a substantial distance, though not completely, down the middle of the adaptor. More specifically, the slot 28 is comprised of a narrow space in the upper surface 22 which extends from the perimeter on one end of the upper surface towards, but not completely to the other end, a corresponding narrow space in the lower surface 24, and the side edge again attaching the perimeter of the narrow spaces in the upper and lower surfaces of the adaptor in order to form the edges of the slot. The slot 28 is obviously for the purpose of sliding the adaptor 20 onto and, if desired, off of the decoy 10. The slot 28 further includes a number of opposing abutments or notches 30 so that the slot will fit snugly around the keel 14. The opposing notches 30 on the adaptor 20 preferably provide an interference fit over protruding nubs 38 on the side of the keel 16. The slot 28 effectively divides the hollow adaptor 20 into a first chamber and second chamber, although there may still be fluid communication between the first and second in the area 35 in which there is no slot.

Figure 6:
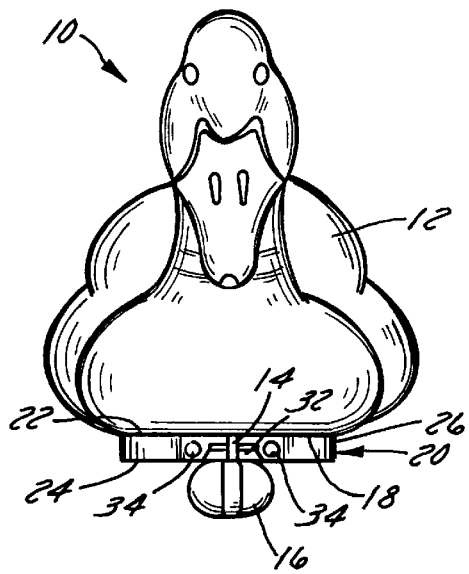
FIG. 6 is a front view of the decoy with the adaptor attached thereon.
Figure 7:
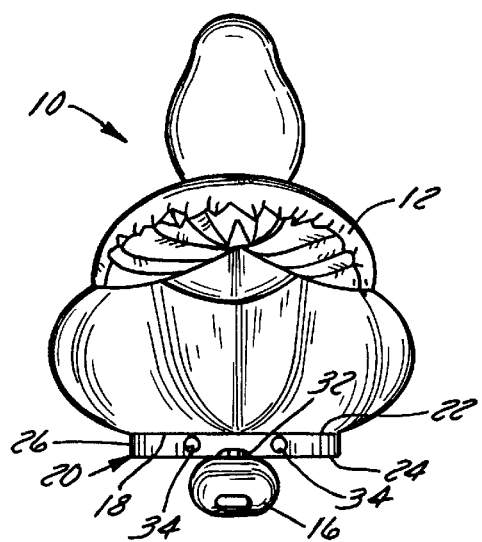
FIG. 7 is a rear view of the decoy with the adaptor attached thereon.
Figure 8:
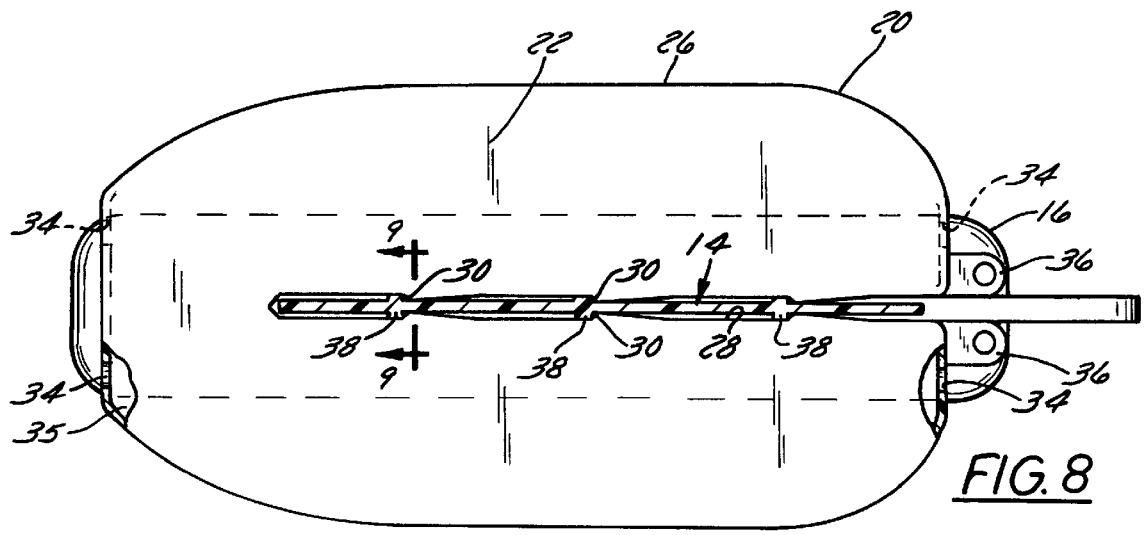
FIG. 8 is a sectional view of the decoy (along line 8—8 of FIG. 1).
Figure 9:
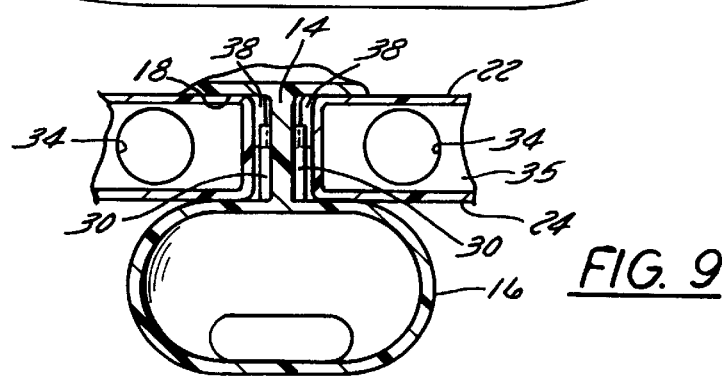
FIG. 9 is a cross-section view of the keel, ballast tank and adaptor (along line 9—9 of FIG. 8).

The adaptor also includes water inlet and outlet orifices 34. The orifices 34 are preferably located on the side edge 26 of the adaptor 20, and there is preferably an inlet and outlet orifice for each of the first and second chambers of the adaptor. Specifically, there is at least one orifice, and preferably two orifices (one for each half of the adaptor body) on the forward end of the adaptor body, as shown in FIG. 6. There is also at least one orifice, and preferably two orifices (one for each half of the adaptor body) on the rearward end of the adaptor body, as shown in FIG. 7. Ballast water automatically flows through the orifices into the hollow adaptor when the decoy is placed onto the water in order to stabilize it. Water is easily poured out of the orifices when the hunter removes the decoy from the water so that it is lighter for carrying the decoy to and from the hunting spot.

The adaptor may also be provided with an eyelet tab 36 so that the hunter can attach a string for retrieving the adaptor and/or the decoy. If desired, eyelet tabs 36 may be placed on the periphery of both the first and second chambers, near the open end of the slot 28 so that the adaptor 20 may be secured to the keel 16 of the decoy 10 with a string or other suitable fastener.

The self-righting stabilizing adaptor of the present invention is designed to effectively lower the center of gravity of the decoy so that, in the event the decoy is lands upside down on a body of water, the decoy will tip over to the upright position. Further, the additional weight of the adaptor enhances the stability of the decoy, especially when the hollow chamber becomes filled with ballast water.

It is understood that the embodiment disclosed above is merely exemplary of the invention, which may be embodied in various forms. Therefore, specific structural details disclosed above are not to be interpreted as limiting, but merely as a basis for the claims and as representative basis for teaching one skilled in the art to employ the present invention in any appropriately detailed structure. Changes may be made in the details of construction and arrangement of the invention without departing from the spirit of the invention, especially as defined in the following claims.

I claim:

1. A floating waterfowl decoy and an adaptor for attachment to said decoy, said decoy comprising a main body shaped like a waterfowl with a keel depending from an underside thereof and said decoy further including a ballast tank attached to a lower end of the keel, said adaptor comprising:

an upper surface;

a lower surface spaced apart from the upper surface;

the perimeters of the upper and lower surfaces being joined at a side edge to thereby form a hollow body;

a slot extending through a substantial portion of the hollow body for attaching said adaptor onto the keel of the decoy; and a first orifice on one end of the adaptor and a second orifice on an opposite end of the adaptor for filling the adaptor with ballast water when the decoy is placed onto a body of water and for pouring the water out of the adaptor when the decoy is removed from the water;

wherein the shape and weight of the adaptor effectively lower the center of gravity of the decoy so that, in the event the decoy is initially placed in the water upside down, the decoy will tip upright, and wherein ballast water in the adaptor stabilizes the manner in which the decoy floats upon the water, and wherein the lower surface of the adaptor is a relatively wide flat surface with a central recess therein to provide a space for the ballast tank on the decoy.

2. The adaptor according to claim 1 wherein the upper surface of the adaptor is a relatively wide flat surface which abuts against the underside of the decoy.

3. The adaptor according to claim 1 wherein the slot in the adaptor further comprises a number of opposing notches in the slot which abut snugly against the side of the keel.

4. The adaptor according to claim 3 wherein in the adaptor further includes a pair of projecting taps on each side of the slot with eyelets therein.

5. The adaptor according to claim 3 wherein said decoy includes a number of protruding nubs on the side of the keel, and the opposing notches in the slot of the adaptor provide an interference fit over nubs on the side of the keel.

* * * * *